July 14, 1970

R. G. MacKENDRICK 3,520,248

CHIP FRYING MACHINE

Filed Sept. 30, 1968

INVENTOR.
Robert G. MacKendrick

BY Alfred J. Morgen

ATTORNEY

July 14, 1970    R. G. MacKENDRICK    3,520,248
CHIP FRYING MACHINE

Filed Sept. 30, 1968    8 Sheets-Sheet 2

INVENTOR.
Robert G. MacKendrick
BY
*Alfred J. Mangen*
ATTORNEY

July 14, 1970   R. G. MacKENDRICK   3,520,248
CHIP FRYING MACHINE

Filed Sept. 30, 1968   8 Sheets-Sheet 3

INVENTOR.
Robert G. MacKendrick

BY

ATTORNEY

July 14, 1970  R. G. MacKENDRICK  3,520,248
CHIP FRYING MACHINE

Filed Sept. 30, 1968  8 Sheets-Sheet 4

INVENTOR.
Robert G. MacKendrick

BY *Alfred J. Mangun*

ATTORNEY

Fig. 9

July 14, 1970  R. G. MacKENDRICK  3,520,248
CHIP FRYING MACHINE

Filed Sept. 30, 1968  8 Sheets-Sheet 6

Fig. 10

INVENTOR.
Robert G. MacKendrick

BY
ATTORNEY

United States Patent Office 3,520,248
Patented July 14, 1970

3,520,248
CHIP FRYING MACHINE
Robert G. MacKendrick, Hamilton, Ohio, assignor to The Procter & Gamble Company, Cincinnati, Ohio, a corporation of Ohio
Filed Sept. 30, 1968, Ser. No. 763,728
Int. Cl. A47j 37/12
U.S. Cl. 99—353        13 Claims

ABSTRACT OF THE DISCLOSURE

A machine for continuously and rapidly cutting sections of a predetermined shape from a dough sheet and frying those sections to provide a crisp, tasty chip-type product. The machine includes a high speed cutting device, a combined molder and carrier to shape the cut pieces and convey them through the fryer, and a transfer device for removing the fried chips from the carrier and conveying them away from the fryer for subsequent processing.

BACKGROUND OF THE INVENTION

This invention relates to a chip frying machine wherein the chips are prepared from a formulated dough which is provided to the machine in thin sheet form. More particularly, the invention relates to an improved chip-frying machine for continuously, rapidly, and uniformly cutting, frying, and shaping chip-type products prepared from sheets of dough.

The usual method of frying potato chip products involves the slicing of raw potatoes, the insertion of these slices into a reservoir of hot fat for a predetermined period so that the slices are fried to a crisp state, and then the removal of the fried chips from the fat. The chips so prepared have a random surface curvature which is influenced by the diameter and thickness of the potato slices and is dependent both upon the amount of time the slices are immersed in the hot fat and the temperature of the fat. The random shapes which the chips assume require that they be randomly packaged. Such a packaging arrangement results in a low bulk density of the product by reason of the large amount of air space within the package and increases the amount of packaging material required, thereby increasing the cost of such a package. In addition, the potato slices are not positively conveyed through the fat in a controlled manner, resulting in differences in color and texture of the resulting chips due to the differing times they are exposed to the hot fat. Both the ultimate chip shape and the frying time for each chip are difficult to control in the usual chip-producing apparatus, and do not permit the production of chips having a uniform color, texture, and shape.

In the co-pending application of Alexander L. Liepa, Ser. No. 683,083, filed Oct. 31, 1967, entitled "Method of and Apparatus for Preparing Chip-Type Products," and commonly owned by the assignee of the present invention, a machine is described with which uniformly shaped chips can be prepared from a formulated dough. The present invention is an improvement over that machine in that it permits the manufacture of uniformly shaped, formulated chip-type products at a significantly higher speed than can be attained with the machine disclosed in the Liepa application. In the machine described in the Liepa application the speed at which the machine can be operated is limited because of the use of a reciprocating cutter. However, in the machine described in present application the reciprocating cutter is replaced with a rotary cutter which can be operated at significantly higher speeds, thus permitting the manufacture of a larger number of chips within the same time period. Additionally, the machine herein described includes a pair of carrier chains for each carrier and also includes a vacuum transfer means to remove the fried chips from the carriers.

SUMMARY OF THE INVENTION

Briefly stated, in accordance with one aspect of the present invention, a machine is provided for shaping and frying thin pieces of edible dough to a pre-determined shape. A high-speed rotating cutting means is provided to continuously cut shaped pieces from the sheet of dough and to deposit them on a carrier means which simultaneously carries and shapes the dough pieces. The latter are conveyed by the carrier through a frying means for a predetermined period of time, after which they are removed from the carrier by a vacuum removal means for subsequent processing.

DESCRIPTION OF THE PREFERRED EMBODIMENTS

Figures 1, 2:
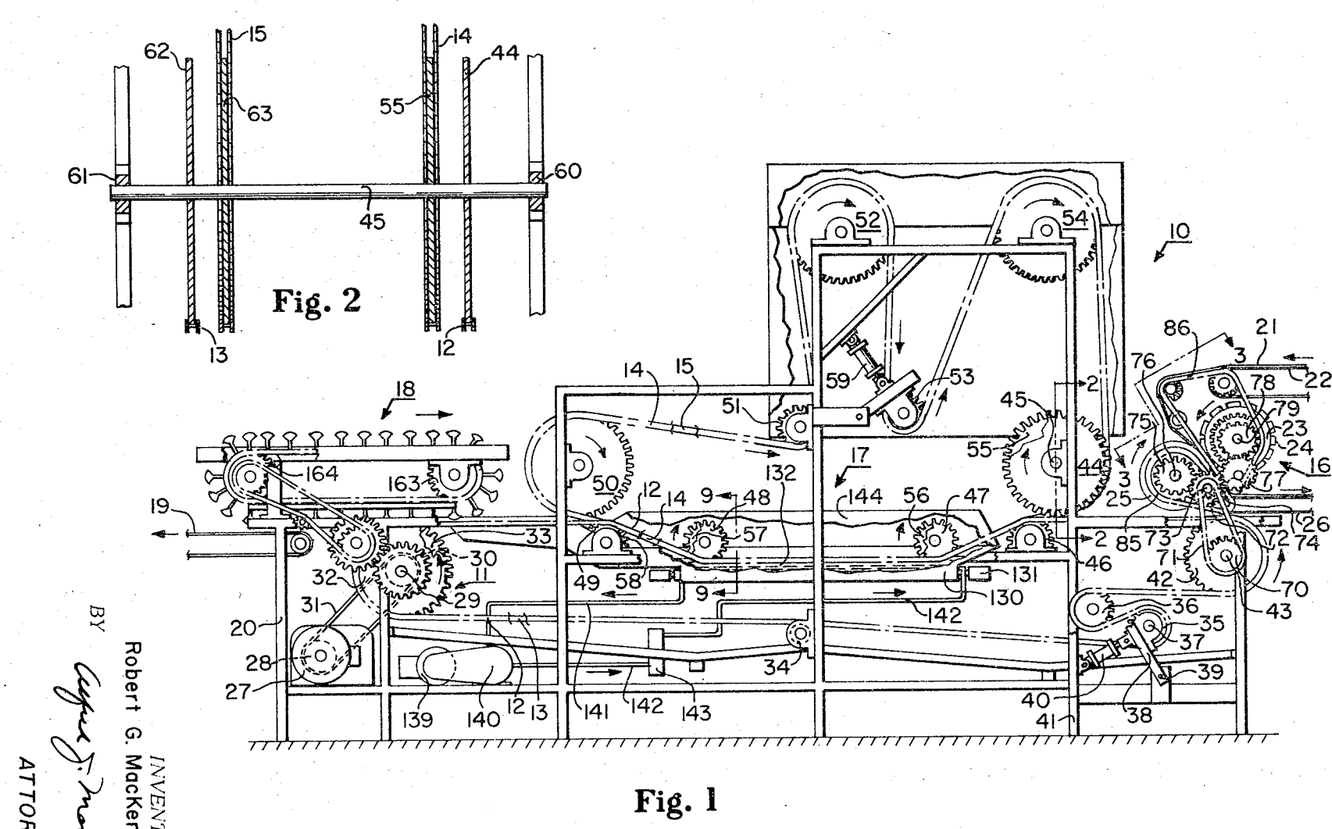
FIG. 1 is a side view of the machine of the present invention, partially broken away, showing the various parts thereof in their operative relationship.
FIG. 2 is a cross-sectional view taken along the line 2—2 of FIG. 1 showing a portion of the driving mechanism.

Referring now to the drawings and particularly to FIG. 1 thereof, there is shown the machine 10 of the present invention which includes a drive system 11 for driving a plurality of endless chains 12, 13, 14, and 15 carrying cooperating carrier members, a dough cutting section 16 for rapidly cutting sections of predetermined shape from a dough sheet, a fryer section 17 for frying the sections so cut, and a transfer section 18 for removing the fried chips from the carriers and delivering them to a suitable conveyor 19 for subsequent processing. Each of the various portions of the machine is suitably mounted and supported by machine frame 20.

SUMMARY OF MACHINE OPERATION

In operation, a sheet of dough 21 is carried to dough cutting section 16 by means of a conveyor belt 22 or other suitable carrying means. Dough sheet 21 then passes between a cutter roll 23 which has a plurality of cutters 24 on the periphery thereof and a backup roll 25 which cooperates with cutter roll 23 to cut dough sections of predetermined size and shape from dough sheet 21. After the sections are cut from dough sheet 21, the remainder of the sheet is returned to a sheet-forming station (not shown) by means of a scrap return conveyor belt 26. The individual dough sections are retained on the surface of backup roll 25 by means of vacuum applied through a plurality of holes in the periphery thereof as will hereinafter be explained. When the dough sections on the surface of backup roll 25 have reached the lowermost portions of their respective paths of travel, they are forcibly ejected from the surface of backup roll 25 by means of a blast of air applied through the peripheral holes therein. The dough sections then fall onto lower carrier members (which will subsequently be described in greater detail) positioned beneath the backup roll and carried by endless chains 12 and 13. The carriers and the cut dough sections travel downstream a short distance whereupon matching and mating carrier members carried by endless chains 14 and 15 are brought into cooperative engagement with the lower carrier members. Chains 12, 13, 14, and 15 carry the engaged carrier members through fryer section 17 during which time the dough sections are fried to a crisp state and emerge as crisp, fried chips. Upon leaving fryer section 17, the upper carrier members separate from the lower carrier members and the latter proceed downstream with the fried chips to transfer section 18, whereupon the fried chips are removed from the lower carriers and deposited on conveyor belt 19 or the like for subsequent processing.

Machine drive system

Electric motor 27 mounted on machine frame 20 includes a sprocket 28 which drives a main power shaft 29 through sprocket 30 by means of an endless chain 31. Connected to main shaft 29 are a pair of spaced coaxial sprocket wheels 32, 33 which rotate in a counter-clockwise direction and drive lower carrier chains 12 and 13 respectively. The latter are endless chains and since each travels a similar path but is spaced transversely from the other, the ensuing description will be based on the path of travel chain 12. It is to be understood that chain 13 travels a similar path over similar sprockets but is spaced transversely therefrom.

Chain 12 travels around sprocket 32 and then over idler sprocket 34 and around sprocket 35 and fixed, idler sprocket 36. Sprocket 35 is mounted on shaft 37, which is journalled in support member 38 which, in turn, is pivotally connected to machine frame 20 by means of pin 39. Thus, the common axis of both shaft 37 and sprocket 35 can be rotated about pin 39 to vary the position thereof with respect to machine frame 20. A hydraulic cylinder 40 is interposed between a vertical strut 41 of machine frame 20 and support member 38 and is suitably connected to a source of hydraulic pressure to impose a constant tension on chain 12, which upon startup of the machine will expand in length because of thermal expansion induced by the high temperature in frying section 17.

After passing around idler sprocket 36, chain 12 passes around sprocket 42 which drives shaft 43, from which dough cutting section 16 derives its power, as will hereinafter be explained in further detail. Thereafter, chain 12 passes under and drives sprocket 44 and associated shaft 45 and then over sprocket 46 under sprockets 47 and 48, and over sprocket 49 whereupon it returns to sprocket 32. Between sprockets 46 and 47 the line of travel of chain 12 is displaced downwardly so that the chain travels into fryer section 17. Between sprockets 47 and 48 chain 12 travels in a path substantially parallel to the paths between sprockets 42 and 44 and between sprockets 49 and 32, but spaced vertically downwardly therefrom. Between sprockets 48 and 49 chain 12 is displaced upwardly out of fryer section 17.

Upper carrier chains 14 and 15, like lower carrier chains 12 and 13, also travel similar paths but are spaced transversely from each other as shown in FIG. 2, and thus the description of the upper carrier chain system will be confined to chain 14 with the understanding that chain 15 traverses a similar path but is spaced transversely from the path of chain 14.

Upper carrier chain 14 passes around sprockets 50, 51, 52, 53, 54, 55, 56, 57, and 58. Between sprockets 55 and 50 chain 14 traverses a path parallel to that of chain 12 as the latter contacts sprockets 44, 46, 47, 48, and 49, respectively. After passing over sprocket 58, upper chain 14 passes around sprocket 50 to idler sprocket 51, thence over sprocket 52 and around pivoted sprocket 53 which together with its associated hydraulic cylinder 59 serves to maintain upper chain 14 under tension in a manner similar to that of sprocket 35 by taking up the slack therein resulting from thermal expansion.

As shown in FIG. 2, upper chain 14 is driven through shaft 45 carried in bearings 60 and 61 supported by machine frame 20, which shaft, in turn, is driven by lower carrier chain 12 through sprocket 44. As also shown therein, lower carrier chain 13 contacts sprocket 62 which is transversely spaced from corresponding sprocket 44 driven by lower carrier chain 12. Similarly, upper carrier chain 15 contacts sprocket 63, which is spaced from corresponding sprocket 55 contacted by upper carrier chain 14. Thus, lower carrier chains 12 and 13, which are powered by motor 27, distribute the driving power to upper carrier chains 14, 15, as well as to shaft 43 from which dough cutting section 16 is driven.

Dough cutting section

As shown in FIG. 1, dough cutting section 16 comprises a cutter roll 23 having a plurality of cutters 24 mounted on the periphery thereof and, in cooperating relationship therewith, a backup roll 25 having a resilient surface. Cutter roll 23 and backup roll 25 are both driven at the same peripheral speed and derive their power from shaft 43 by means of sprocket 70 driving chain 71 which, in turn, drives sprocket 72 connected to shaft 73, to which drive gear 74 is attached. Drive gear 74 drives a cooperating gear 75 which is connected to shaft 76 on which backup roll 25 is mounted and it also drives an idler gear 77 which, in turn, drives gear 78 mounted on shaft 79, which carries cutter roll 23.

Figure 3:
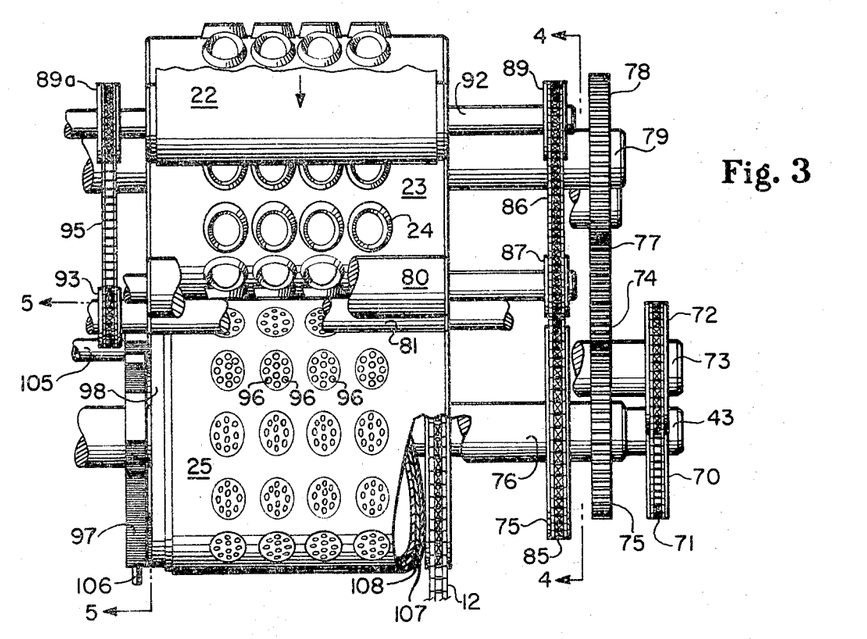
FIG. 3 is a view taken along the line 3—3 of FIG. 1 showing the components of the cutting mechanism and its associated drive system.

As shown more clearly in FIGS. 3 and 4, infeed conveyor 22 carries dough sheet 21, which then passes around a pair of driven rollers 80, 81 which are so positioned relative to cutter roll 23 and backup roll 25 that dough sheet 21 contacts backup roll 25 first and is positioned thereon prior to cutting by means of vacuum, as will be hereinafter explained. As the dough sheet passes between cutter roll 23 and backup roll 25, the cooperative action of cutter 24 on cutter roll 23 and the periphery of backup roll 25 cuts sections from the dough sheet, which sections are held on the periphery of backup roll 25 by means of a vacuum system. The remainder of the sheet passes against roller 82 and then to scrap return conveyor 26 for recycling.

Figure 4:
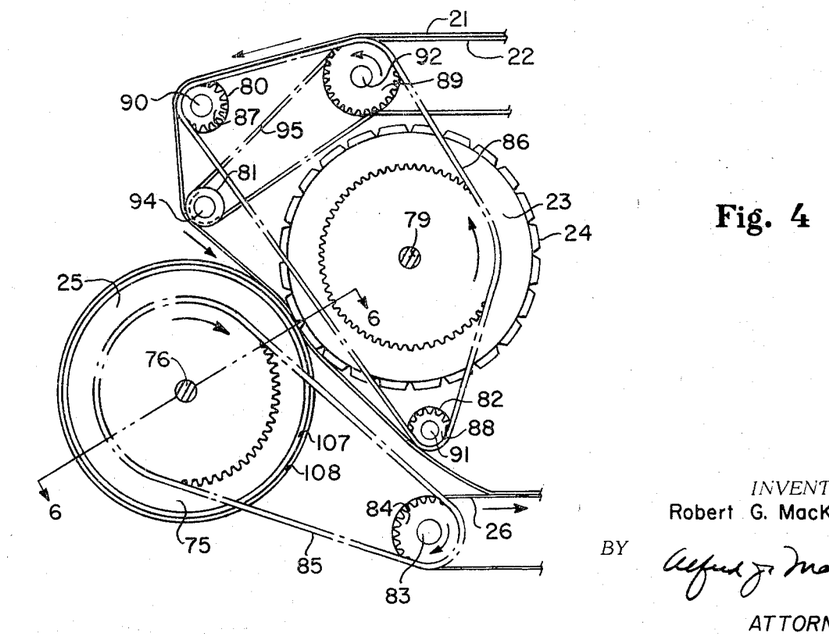
FIG. 4 is a side view of the cutting mechanism taken along the line 4—4 of FIG. 3.

As shown in FIG. 4, scrap return conveyor 26 is driven by shaft 83 which derives its power from sprocket 84 driven from sprocket 75 on backup roll 25 by means of chain 85. Similarly, rollers 80 and 82 and infeed conveyor 22 are driven by chain 86 through sprockets 87, 88, and 89, respectively, attached to shafts 90, 91, and 92, respectively. Driven roller 81, which insures that dough sheet 21 will contact backup roll 25 first, is driven through sprocket 93 attached to shaft 94 as shown in FIG. 3. Referring to FIG. 4 once again, sprocket 93 is driven by chain 95, which derives its power from sprocket 89a driven by shaft 92. Thus the power for the entire dough cutting section 16 is derived from shaft 43 by means of sprocket 70 driving chain 71. From that point on the power is transferred to the various rolls and conveyors shown in FIGS. 3 and 4.

The cutting of the dough is accomplished by means of a pinching action wherein cutters 24 on cutter roll 23 are arranged so that they slightly deform the surface of backup roll 25, and when dough sheet 21 is interposed therebetween the dough sections are cut therefrom by the interference at the line of contact between the two rolls 23 and 25. Preferably the interference beween cutters 24 and the surface of backup roll 25 is at least about 0.005 inch to insure complete separation between the dough sections to be cut and dough sheet 21. Each of cutters 24 on cutter roll 23 is so positioned that it is in registry with a group of apertures 96 in backup roll 25 so that when dough sections are cut from the sheet the cut sections overlie a group of such apertures. After being cut from the sheet the dough sections are restrained on the periphery of backup roll 25 by means of vacuum which is applied through the apertures 96 in the surface thereof. The vacuum is maintained as backup roll 25 rotates. As the dough sections reach the lowest position in the path of travel of backup roll 25 there is a sudden application of pressure to those apertures, which pressure forcibly ejects the dough sections from the surface of backup roll 25. The cut dough sections fall onto a carrier which will hereinafter be described in more detail.

Figure 5:
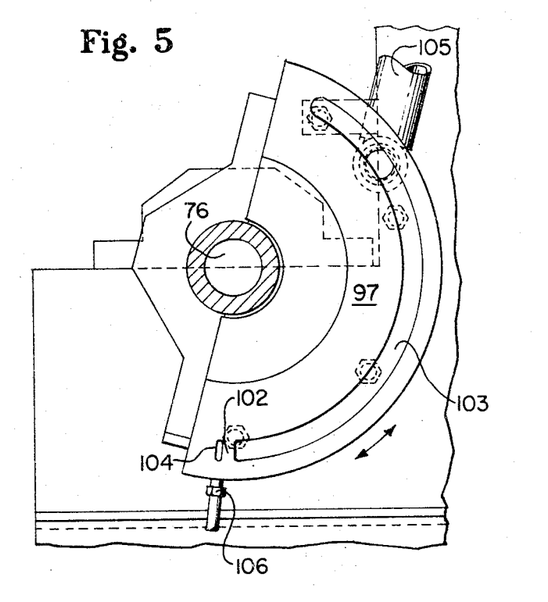
FIG. 5 is a side view of a portion of the cutting apparatus taken along the line 5—5 of FIG. 3.
Figure 6:
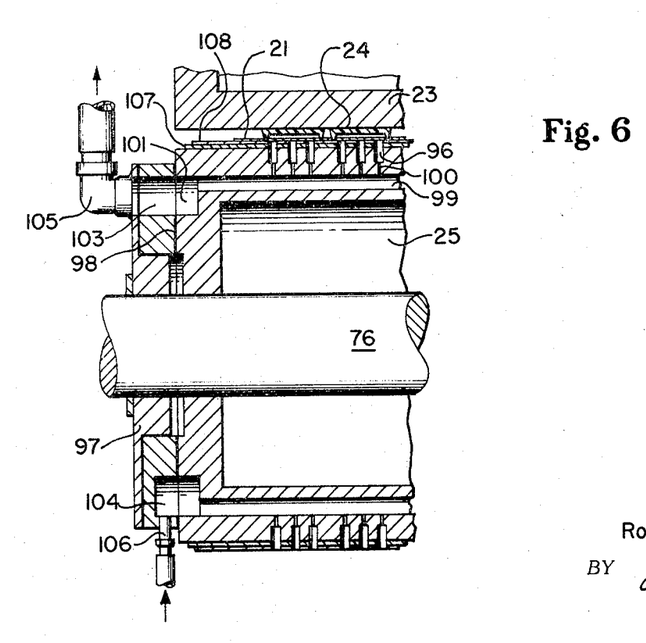
FIG. 6 is a cross-sectional view, partially broken away, taken along the line 6—6 of FIG. 4.

The details of the pressure and vacuum system are shown in FIGS. 5 and 6. As therein shown, a stationary chamber or shoe 97 is so positioned with respect to backup roll 25 that it is in contact with a portion of one end 98 of roll 25. Backup roll 25 includes a number of longitudinally arranged manifolds 99 which provide communication between the end 98 of roll 25 and apertures 96 in the outer surface thereof by means of interconnecting passageways 100. Manifolds 99 each terminate in a slot 101 in end 98 of backup roll 25. Stationary shoe 97, shown in detail in FIG. 5, comprises two sections separated by an intermediate wall 102 which divides the inside of shoe 97 into a vacuum compartment 103 and a pressure compartment 104. Vacuum compartment 103 is larger than pressure compartment 104 and preferably encompasses just slightly less than half of the slots 101 at any one time. Pressure compartment 104 is sized to come into communication with only a single slot 101 at any one time. Vacuum compartment 103 is connected to a source of vacuum (not shown) through a suitable connection 105. Similarly, pressure compartment 104 is connected to a source of pressure (not shown) through a suitable connection 106.

In the course of rotation, various of the slots 101 in backup roll 25 come into communication either with vacuum compartment 103 connected to the source of vacuum or pressure compartment 104 connected to the source of pressure. In the view shown in FIG. 5, backup roll 25 (not shown) rotates in a clockwise direction. As the various slots 101 in end 98 come into communication with vacuum compartment 103, a vacuum is applied to the surface of the roll through slots 101, manifolds 99, passageways 100 and apertures 96 in the outer surface of roll 25. As backup roll 25 continues to rotate, the vacuum is maintained until that particular line of dough sections reaches the lowermost portion of its path of travel, whereupon the slot 101 comes into communication with the pressure compartment 104 and the sudden application of the pressure to the apertures 96 through manifold 99 and passageways 100 causes the dough section to be forcibly ejected from the surface of backup roll 25 in a downward direction, and to fall onto a carrier.

The outer surface of backup roll 25 is preferably resilient to permit the pinching action by which sections are cut from dough sheet 21 by cutters 24. Although the core of the roll will preferably be a relatively inelastic material such as steel, cast iron, or the like, it is preferred that a resilient outer layer 107 be attached to the steel core to provide the desired resilient surface. Layer 107 can be made from hard rubber, polyethylene, polypropylene, or the like. A second, wear-and-cut-resistant layer 108 is preferably applied over layer 107 to increase the operating life of the resilient surface. Preferably, layer 108 is a thinner and harder material than layer 107 and has good cut resistance. A suitable material for layer 108 is Teflon, a fluorocarbon polymer available from E. I. du Pont de Nemours & Co., Inc.

Carrier assembly

Figure 7:
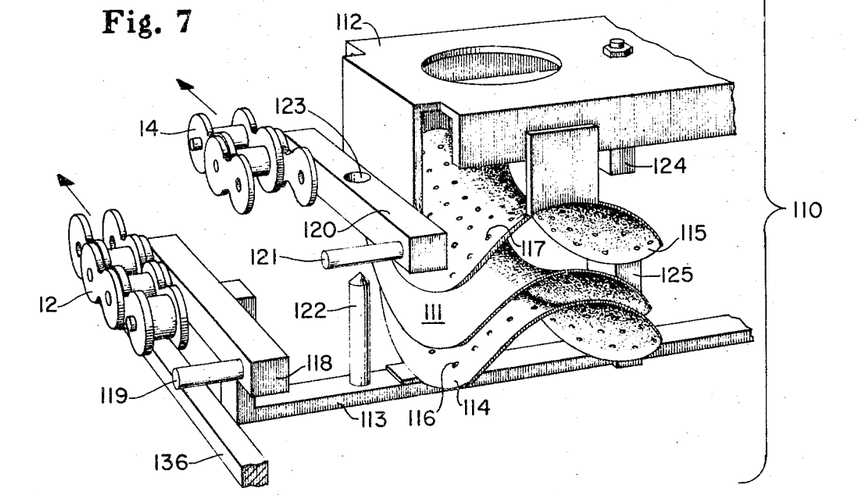
FIG. 7 is an exploded view of the carrier assembly showing the various parts thereof in separated relationship for purposes of clarity.
Figure 8:
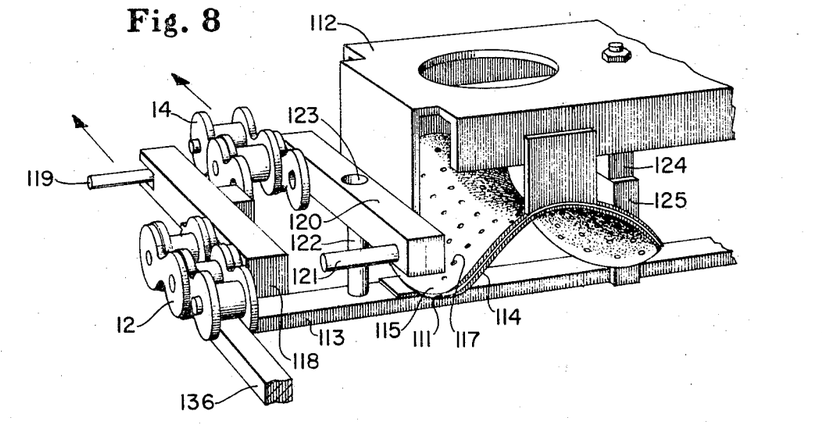
FIG. 8 is a view similar to FIG. 7 but shows the carrier assembly with the parts thereof in their closed relationship with a dough section positioned therebetween.

After they are cut from dough sheet 21 and ejected from the surface of backup roll 25, the cut dough sections are deposited on a suitable carrier which conveys the sections through the remainder of the machine for the subsequent processing steps. A preferred form of carrier assembly 110 is shown in FIGS. 7 and 8 with a cut dough section 111 positioned therebetween. Carrier assembly 110 includes an upper carrier member 112 and a lower carrier member 113. The latter includes a plurality of shaped lower mold members 114 attached thereto as by welding. Similarly, upper carrier member 112 includes the same number of upper mold members 115 as there are lower mold members 114 on lower carrier member 113. Mold members 114 and 115 are similarly configured to impart the desired shape to the fried chips and to restrain dough sections 111 during the frying operation. Thus, mold members 114 and 115 simultaneously carry and shape dough sections 111. Additionally, each of mold members 114, 115 is provided with a multiplicity of apertures 116 and 117, respectively. These apertures are preferably uniformly distributed over the surfaces of the mold members 114, 115 to permit the heated frying medium to come into intimate contact with the surfaces of dough sections 111 positioned therebetween and thereby fry the same to a uniform color, texture, and shape. Although it is preferred that apertures 116, 117 be of uniform size and be distributed so that substantially all areas of the surfaces of dough sections 111 are contacted by the hot fat, non-uniformly sized apertures can also be used. The spacing of the apertures is limited only by the effect thereof on the rigidity of the mold members 114, 115, which must maintain their shape in order to provide chips of the desired uniform surface conformation.

In terms of size, apertures having a diameter greater than about ⅜ inch are undesirable because the water dispersed within the dough can vaporize into steam during frying to form surface bubbles thereon, as a result of which the dough can expand through apertures 116, 117 and result in difficulty when the fried chips is to be removed from the mold members 114, 115. In an exemplary embodiment of the present invention, mold members 114, 115 can be fabricated from stainless steel sheet of about 1/32 inch in thickness, and can have circular apertures of about 1/16 inch diameter therein with the centers of the apertures spaced uniformly from one another by about 3/16 inch in a staggered pattern.

When the cut dough sections are ejected from the surface of backup roll 25 they are deposited on lower mold members 114 which pass under backup roll 25 in timed relation to the angular speed of the roll. Upper mold members 115 are then brought into closely fitting engagement with lower mold members 114 to restrain the cut sections therebetween. Thereupon carrier assembly 110 travels through frying sections 17 for a predetermined time period and then to transfer section 18.

Lower carrier member 113 has a crossbar 118 at each end thereof to which are attached pins 119 to secure the same to lower carrier chains 12 and 13 (not shown). Similarly, upper carrier member 112 has a crossbar 120 at each end thereof to which are attached pins 121 to secure the same to upper carrier chains 14 and 15 (not shown). Mold members 114, 115 are aligned with respect to each other by means of pins 122 at each end of lower carrier member 113, which pins are adapted to fit within apertures 123 provided in crossbars 120 of upper carrier member 112. Only a portion of the carrier assembly is shown in FIGS. 7 and 8 and it is to be understood that the ends of carrier members 112 and 113 which are not shown are of the same structure and include similar parts as the ends shown, except that in assembled form the ends not shown correspond with the mirror image of the ends shown. This arrangement is shown generally in the cross-section of the fryer in FIG. 9.

Two pins 122 are utilized in order to positively position the mold members. The vertical spacing between the mold members 114, 115 is accomplished by spacer block 124 on upper carrier member 112 and spacer block 125 on lower carrier member 113. Preferably spacer blocks 124, 125 are made from a magnetic material and at least one of spacer blocks 124, 125 is a magnet to insure close contact between spacer blocks 124 and 125 and to maintain carrier assembly 110 in assembled condition with the desired spacing between the mold members 114 and 115. Blocks 124, 125 can be secured to carrier members 112, 113 by means of bolts or by welding.

Fryer section

Figure 9:
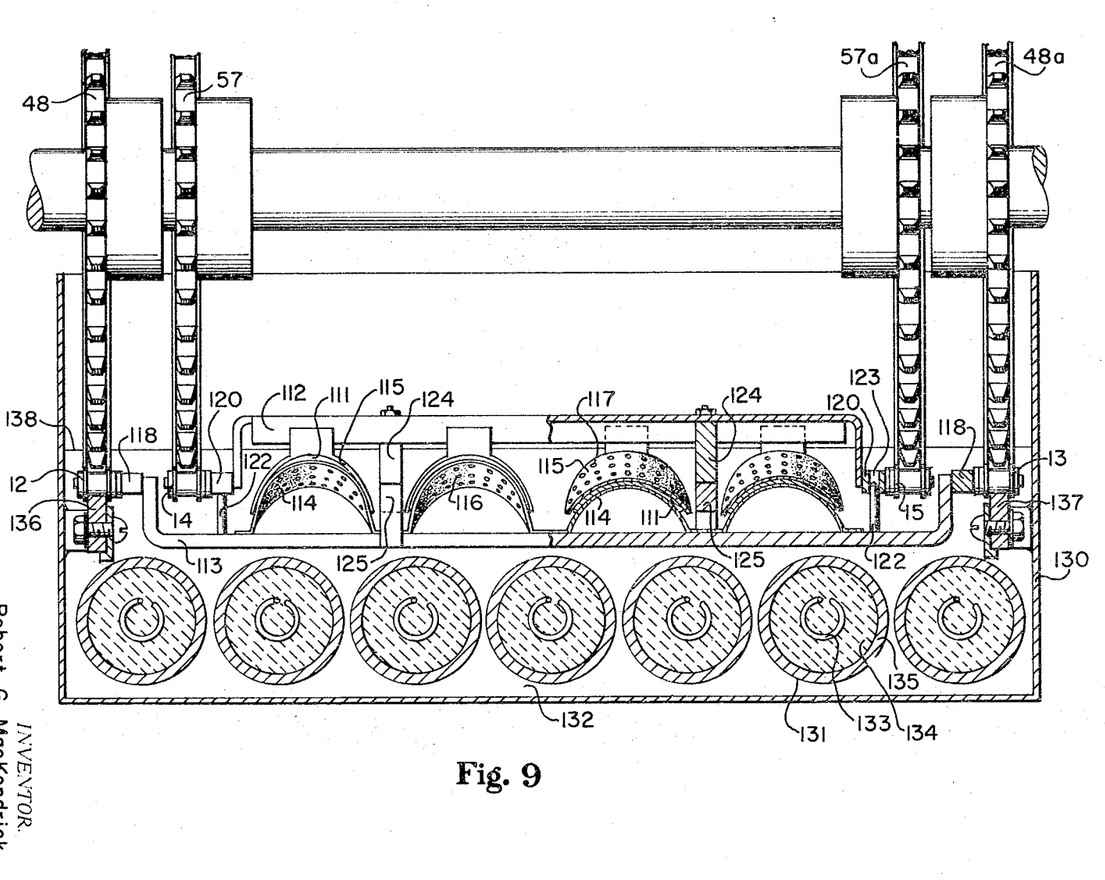
FIG. 9 is a transverse cross-sectional view of the fryer taken along the line 9—9 of FIG. 1 showing the relative position of the carriers and heating elements within the fryer.

Carrier assembly 110 conveys the cut dough sections 111 into frying section 17 of FIG. 1. As therein shown, frying section 17 comprises an elongated tank 130 which includes a plurality of longitudinally arranged heating elements 131. As shown in FIG. 9, heating elements 131 are utilized to maintain frying oil 132 at a predetermined temperature level and comprise a heating coil 133 embedded within a ceramic matrix 134 and surrounded by a steel jacket 135. The sides of frying tank 130 are provided with guide rails 136 and 137 to support and guide lower carrier chains 12 and 13, respectively, at a predetermined level below the surface 138 of frying oil 132.

In the course of traveling through frying oil 132 in frying tank 130, the carrier members displace a quantity of oil equal to their volume and, because of their size and their motion, they cause the oil to accumulate at the downstream end of tank 130. This lowers the oil level at the upstream end and thereby causes the chips to be fried for less than the desired time since they may not be immersed in the hot oil for the complete length of tank 130. In order to maintain the oil at a relatively uniform level in tank 130, motor 139 is provided to drive circulating pump 140 (see FIG. 1) which withdraws oil from the downstream end of tank 130 through conduit 141 and circulates it to the upstream end of the tank through a separate return conduit 142 to maintain the oil at a substantially uniform level in tank 130. If desired, filter 143 can be positioned in return conduit 142 to remove any burned pieces of chip or other foreign matter from the recirculated oil.

A hood 144 is provided over frying tank 130 as shown in FIG. 1. The hood permits blanketing the frying oil with either steam or an inert gas to reduce contact of the oil with air and thereby retard deterioration of the oil by oxidation. The inert gas or steam can be provided from an external source, if desired, or alternatively, the steam given off when the dough is fried can be trapped over the oil to provide the desired gas blanket.

Transfer section

After the cut dough sections are fried they are conveyed from frying section 17 to transfer section 18 as shown in FIG. 1. In transfer section 18 the fried dough sections, or chips, are removed from the lower carrier members after the upper carriers have been separated therefrom, and are conveyed either to a processing station or to another conveyor for subsequent processing. As can further be seen in FIG. 1, after frying is completed, the lower carrier chain 12 travels to transfer section 18 while upper carrier chain 14 passes around sprocket 50 and is conveyed over successive sprockets 51, 52, 53, 54, and 55 back to the point at which the upper carrier members contact the lower carrier members just downstream of dough cutting section 16.

Figure 10:
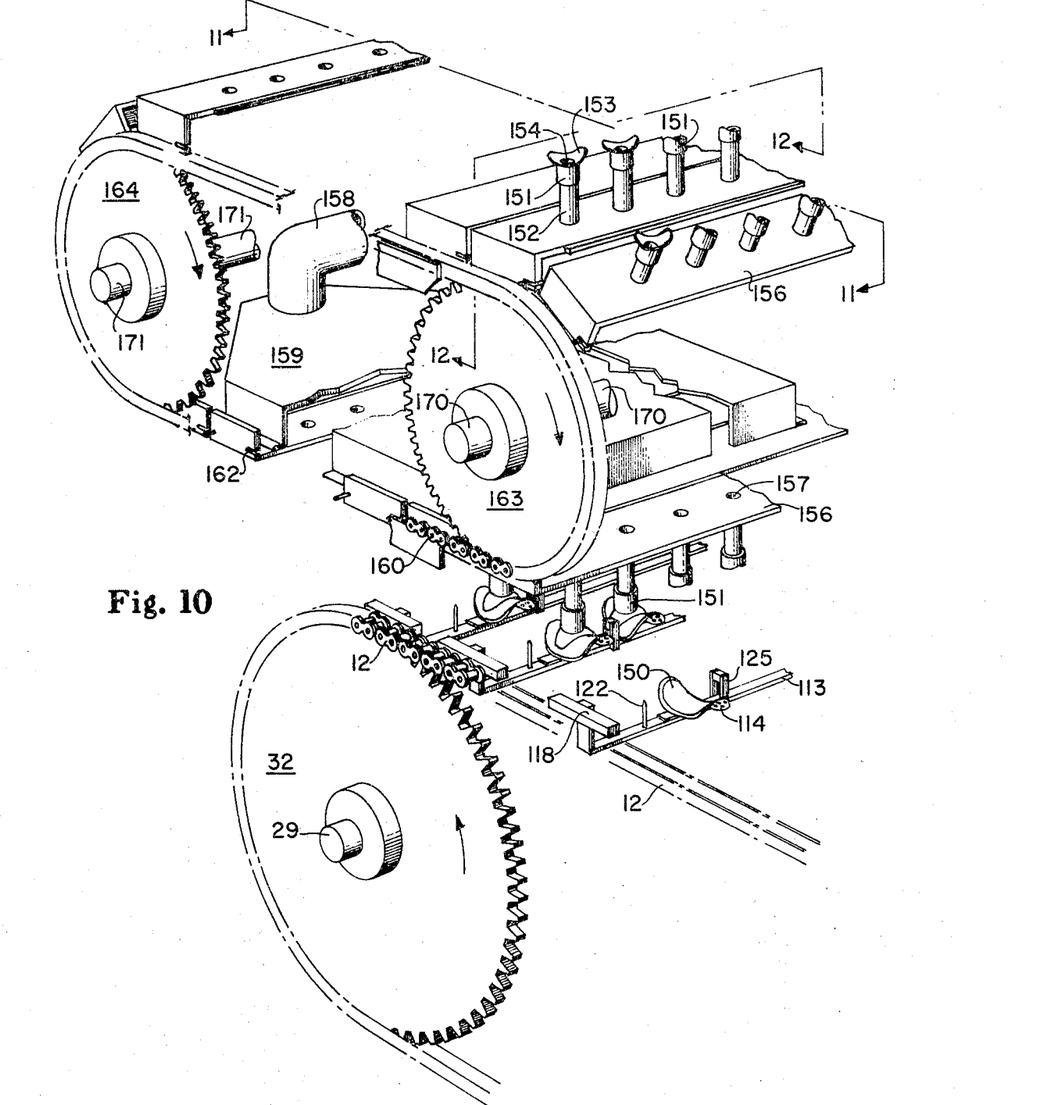
FIG. 10 is a perpsective view of the vacuum transfer apparatus which removes the fried chips from the carriers.

Transfer section 18 is shown in more detail in FIG. 10. Lower carrier members 113 are conveyed by chains 12 and 13 (not shown) which carry the fried dough sections or chips 150 to a position underlying a series of pickers 151 which remove chips 150 from lower mold members 114 by means of vacuum, as will hereinafter be more fully explained, and convey them downstream for subsequent processing.

Figure 12:
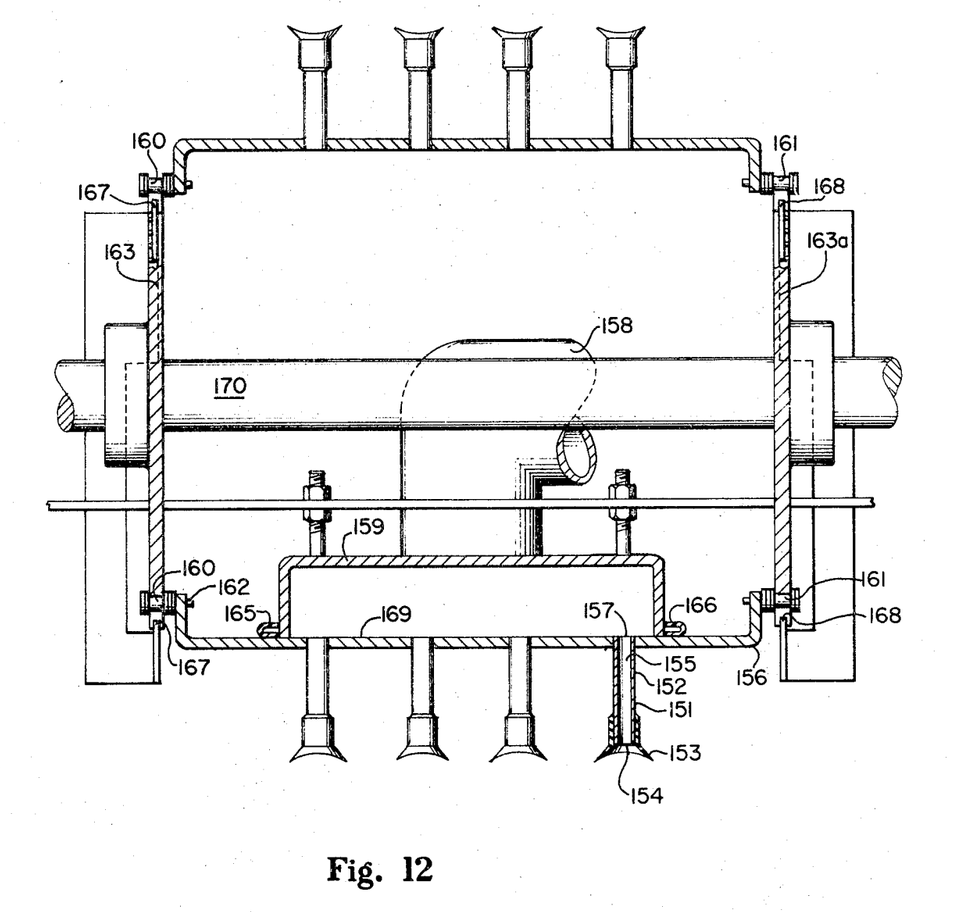
FIG. 12 is a transverse cross-sectional view taken along the line 12—12 of FIG. 10, showing a section of the vacuum transfer apparatus and the details of the picker members.

As best seen in FIG. 12, pickers 151 include a hollow stem 152 on which is positioned a chip contacting end 153 which preferably conforms in shape with that of the chip. End 153 is made from a soft, oil-resistant material such as, for example, silicone rubber, and is cupped so as to conform with a portion of the surface of the midsection of chips 150. End 153 has an aperture 154 therein in communication with the hollow interior 155 of stem 152, a number of which are mounted on a support plate 156. The latter includes apertures 157 to provide a communication path between the several apertures 154 in ends 153 and the source of vacuum (not shown). The vacuum can be provided by a vacuum pump (not shown), which is connected with conduit 158 to impose a vacuum on vacuum chamber 159. Vacuum chamber 159 extends the distance that the chip is to be held by pickers 151 and overlies a plurality of support plates 156 in tightly fitting relationship to maintain the vacuum therein.

Figure 11:
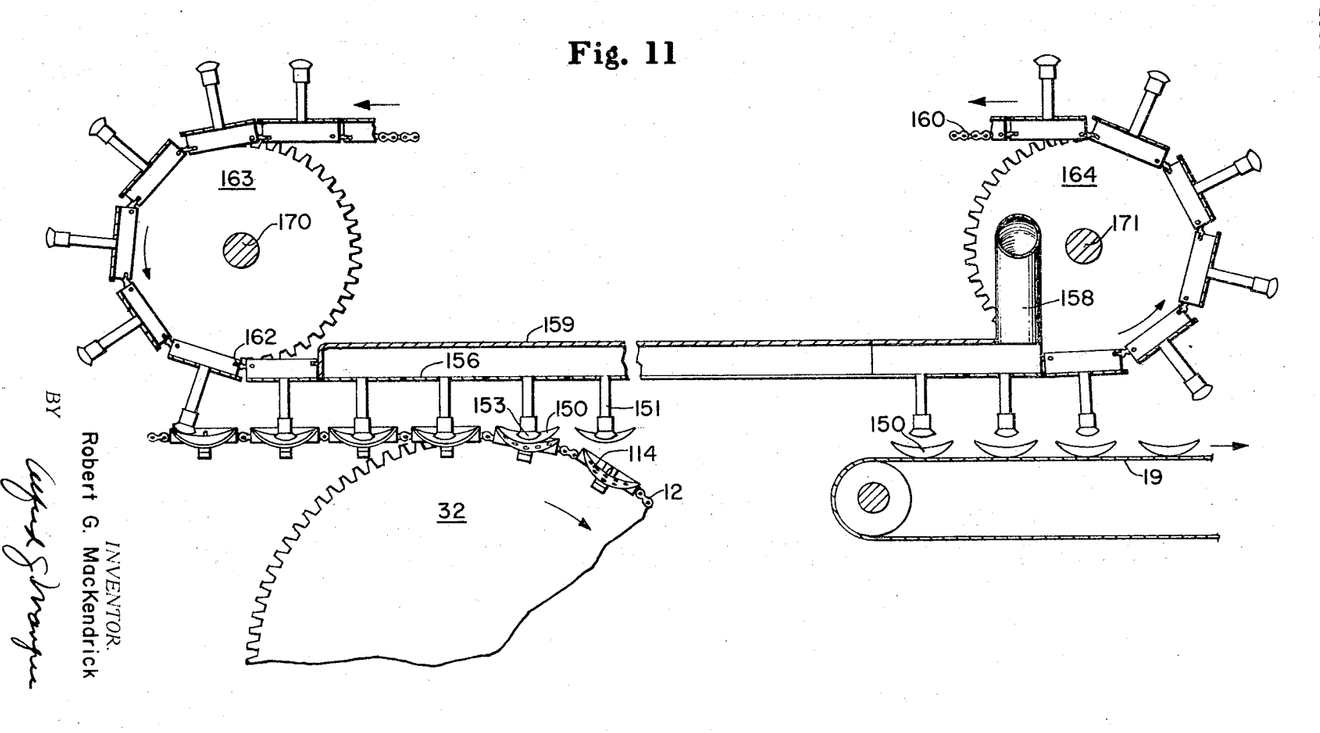
FIG. 11 is a longitudinal cross-sectional view of the vacuum transfer apparatus, partially broken away, taken along the line 11—11 of FIG. 10.

In FIG. 11 there is shown a cross-sectional view illustrating the relative positions of lower mold members 114, pickers 151, support plates 156, and vacuum chamber 159. A series of support plates 156 are affixed to a pair of endless chains 160, 161 by means of pinned connections 162. Since chain 161 traverses a path similar to that of chain 160 but spaced transversely therefrom, the following discussion will be confined to chain 160 with the understanding that chain 161 operates similarly but spaced transversely from chain 160. Chain 160 passes around a pair of spaced sprockets 163, 164 carried by shafts 170, 171, respectively. As pickers 151 pass around sprocket 163 their ends 153 are positioned adjacent fried chips 150 so that the spacing therebetween is on the order of from 0 to about 1/8 inch. As picker support plates 156 pass under vacuum chamber 159 the communication path provided by hollow stems 152 to ends 153 imposes a vacuum at apertures 154 which causes a fried chip 150 to be drawn to picker 151 and to become separated from lower mold member 114. Picker 151 and chip 150 are conveyed downstream to, for example, a finished chip conveyor 19 which can carry the chips to, for example, a salting device (not shown) or to a packaging station (not shown). When support plates 156 are no longer in communciation with the vacuum in vacuum chamber 159, the holding force is no longer present and the chips fall downwardly due to gravity onto, for example, conveyor 19. Thereupon the pickers travel around sprocket 164 and return to their initial position to remove additional chips from other lower mold members.

The communication path between vacuum chamber 159 and the various pickers 151 is shown most clearly in FIG. 12. It can be seen that support plates 156 which carry pickers 151 pass against the lower surface of vacuum chamber 159. Preferably seals 165, 166, which can be of any convenient type as is apparent to those skilled in the art, are provided at the outer ends of vacuum chamber 159 to insure that the vacuum is applied to the ends of the holders and is not otherwise lost due to leakage between vacuum chamber 159 and support plates 156. Additionally, chains 160, 161 pass over rails 167, 168, respectively, to insure close contact between the inner surfaces 169 of support plates 156 and vacuum chamber 159.

It can thus be seen that the present invention provides an improved means for high speed cutting and frying of chip-type products prepared from a formulated dough. Furthermore, the chips so produced are of a desirable predetermined size and shape. However, although described in terms of its suitability for making chip-type products from a sheet of dough, the present machine can also be utilized to prepare uniformly shaped potato chips from thin slices of raw potatoes by suitably depositing the potato slices between the carrier members and then frying the slices in the same manner as herein described with respect to the cut dough sections.

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

What is claimed is:

1. A machine for making shaped, chip-type products from a sheet of dough, said machine comprising:
   (a) rotating cutting means for continuously cutting sections of predetermined shape from said sheet;
   (b) conveying means for conveying said sheet and feeding the same to said cutting means;
   (c) frying means for deep fat frying said cut dough sections until they are crisp, fried chips;
   (d) carrier means for carrying said cut dough sections from said cutter to and through said frying means and simultaneously shaping said cut dough sections to a predetermined surface conformation; and
   (e) vacuum removal means for gently removing said fried chips from said carrier means.

2. The machine of claim 1 wherein said rotating cutting means comprises a driven rotary cutting roll having a plurality of cutters on its periphery and a driven, cooperating backup roll in contact with the cutters of said cutting roll, said rolls being driven at the same peripheral speed.

3. The machine of claim 2 wherein said backup roll has a resilient outer surface and said backup roll and said cutter roll are positioned to provide an interference therebetween to permit the dough sheet to be cut by a pinching action between said cutters on said cutter roll and said backup roll.

4. The machine of claim 3 wherein said backup roll includes a plurality of circumferentially positioned apertures which are periodically and alternately brought into communication with a source of vacuum to restrain said cut dough pieces on the periphery of said backup roll for a predetermined period and a source of pressure to thereafter eject said cut dough pieces from the periphery of said backup roll at a predetermined time.

5. The machine of claim 4 wherein said vacuum and pressure are supplied through a stationary shoe in contact with one end of said backup roll and having separate vacuum and pressure compartments therein which are in periodic communication with slots in the end of said backup roll.

6. The machine of claim 1 wherein said frying means comprises a frying tank having a plurality of heating elements positioned therein to heat a frying fat to a predetermined temperature.

7. The machine of claim 6 wherein said frying means includes a hood overlying said frying tank to contain the steam liberated by the frying of the dough and thereby retard oxidative deterioration of said frying fat.

8. The machine of claim 7 wherein said frying means includes a hot fat circulation system comprising a pump and associated piping for circulating said hot frying fat from the downstream portion of said tank to the upstream portion at a rate of flow proportional to the speed of said carriers through said oil to maintain said oil at a substantially uniform level in said tank.

9. The machine of claim 1 wherein said carrier means includes a pair of endless chains each of which carries at least one forming surface for shaping and holding said dough sections, said forming surfaces being similarly configured to fit in conforming relationship and adapted to constrain said dough sections therebetween while passing through said frying means.

10. The machine of claim 9 wherein said forming surfaces are supported by carrier members and are spaced from each other by a combined holding and spacing system mounted on said carrier members and are positively located with respect to each other by means of a pin on one of said carrier members, which fits an aperture in the cooperating carrier member.

11. The machine of claim 10 wherein said holding and spacing system comprises a magnet on one of said carrier members and cooperating ferromagnetic material on the cooperating carrier member.

12. The machine of claim 1 wherein said vacuum removal means comprises a plurality of tubular picker members in communication with a source of vacuum, said pickers being positioned in overlying relationship to said chips to thereby lift them from said carrier means.

13. The machine of claim 12 wherein each of said tubular members includes a resilient, chip contacting member at its free end, said chip contacting member having an aperture therein in communication with the interior of said tubular member and having a lower surface shaped to conform to that of said fried chips to permit said fried chips to be held thereby when said lower surface is in communication with said source of vacuum.

References Cited

UNITED STATES PATENTS

| | | | |
|---|---|---|---|
| 2,286,644 | 6/1942 | Pringle et al. | 99—353 XR |
| 2,907,268 | 10/1959 | Doolin | 99—353 |
| 3,106,151 | 10/1963 | Porambo | 99—353 |
| 3,294,454 | 12/1966 | Cunningham et al. | 99—353 XR |
| 3,338,154 | 8/1967 | Camacho | 99—353 |
| 3,451,822 | 6/1969 | Fast et al. | 99—100 |

FOREIGN PATENTS 1,034,087   6/1966   Great Britain.

BILLY J. WILHITE, Primary Examiner

U.S. C.L. X.R.

99—355, 100, 404, 407, 427; 214—1; 198—20; 83—98